United States Patent [19]

Bardell

[11] 3,723,837

[45] Mar. 27, 1973

[54] RESISTOR BED STRUCTURE FOR MONOLITHIC MEMORY

[75] Inventor: Paul H. Bardell, Poughkeepsie, N.Y.

[73] Assignee: International Business Machines Corporation, Armonk, N.Y.

[22] Filed: Sept. 22, 1970

[21] Appl. No.: 74,439

[52] U.S. Cl........317/235 R, 317/235 E, 317/235 UA

[51] Int. Cl...............................................H01l 19/00

[58] Field of Search...................317/235, 31; 330/40

[56] References Cited

UNITED STATES PATENTS 3,631,309 12/1971 Myers..................................317/235

3,540,010 11/1970 Heightley et al. ....................340/173

3,505,573 4/1970 Wiedmann...........................317/235

3,571,918 3/1971 Haberecht.............................29/577

3,506,893 4/1970 Dhaka.................................317/235

*Primary Examiner*—John W. Huckert

*Assistant Examiner*—E. Wojciechowicz

*Attorney*—Hanifin and Jancin and George O. Saile

[57] ABSTRACT

A monolithic integrated semiconductor memory structure having both an array of bistable cells and supporting circuits for the array formed in the same semiconductor structure is bilevel powered to reduce the heat dissipation problem. Resistors used in the supporting circuits are located in common resistor beds with a means for making electrical contact, such as a diode, to the resistor bed and to provide bias during the low power standby time to the bed. The means also isolates the bias voltage supply from the bed when the signal to the resistor is increased to the high power level.

10 Claims, 5 Drawing Figures

INVENTOR
PAUL H. BARDELL
BY George O. Saile
ATTORNEY

RESISTOR BED STRUCTURE FOR MONOLITHIC MEMORY

BACKGROUND OF THE INVENTION

Field of the Invention and Prior Art

Monolithic integrated semiconductor memories have arrays of bistable cells. It is desirable to increase the number of storage cells in a monolithic semiconductor structure. The increase in the number of the cells, particularly where the memory circuit is formed of bipolar devices, creates a heat dissipation problem if power is continuously applied to the memory cells. It is necessary to maintain a predetermined minimum current, when the memory cell is in its standby storage condition, to insure that the cell remains in its selected bistable state. If this current should decrease below the predetermined minimum, then the cell may cease to remain in the selected bistable state. To reduce power dissipation, it has been suggested to employ a high power level during the active condition of the cells and a low power level when the cells are in a standby storage condition. The high speed response to a read signal or high speed switching due to a write signal is obtained during the time that the power level is high. The patent application Ser. No. 791,477 filed Jan. 15, 1969 entitled "Monolithic Integrated Semiconductor Array Having Reduced Power Consumption" by W. David Pricer and the patent application Ser. No. 802,927 filed Feb. 27, 1969 entitled "Non-Linear Impedance Means for Transistors Connected to Each Other and to a Common Power Source" by Robert A. Henle, et al., both assigned to the assignee of the present patent application, describe in more detail the problems and solutions for heat dissipation and bilevel powering of monolithic memory cells.

With the advance of the monolithic semiconductor art, it has become possible and desirable to form supporting semiconductor circuits for the memory array in the same monolithic structure as the memory array itself. The types of supporting circuits which are used in the monolithic structure, for example, are the sense amplifiers, word drivers and bit drivers.

The design of the structure of a monolithic integrated semiconductor memory having both an array of bistable cells and supporting circuits for the array in the same semiconductor structure wherein bilevel power is desired to be used to prevent heat dissipation has presented many problems. It is desirable to use the bilevel powering principle to the support circuit as well as to the array and even where possible have a lower standby power applied to the support circuits than to the array cells. It was discovered that the turn on time for supporting circuits having resistors in the monolithic structure is much longer than is desirable. Parasitic capacitances related to the resistor bed cause this poor response time. The obvious solution to the problem was to use an extra high voltage supply to increase response time. The voltage supply would maintain performance but would increase the wirability complexity and be in opposition to the desire for simplicity of design and increased microminiaturization.

SUMMARY OF THE INVENTION

It is an object of this invention to provide a structure which provides a fast transition from standby to the full-power condition for supporting circuits having resistors.

It is a further object of this invention to provide a fast transition from standby to the full-power condition using the already available voltages on the monolithic memory structure and without sacrifice to the desire for simplicity of structure and microminiaturization.

The objects of this invention are accomplished when using a monolithic integrated semiconductor memory structure having both an array of bistable cells and supporting circuits for the array in the same semiconductor structure which has means for bilevel powering the semiconductor structure. Means for making an electrical contact to the region or bed containing at least one or more resistors is located in the region. This means is connected to a bias source means which provides a bias to the region during the time of low powering of the monolithic memory structure. The means for making electrical contact is, for example, a diode which is capable of electrically isolating the bias when the resistor signal is increased past a predetermined level toward the higher power level.

DESCRIPTION OF THE PREFERRED EMBODIMENTS

Figure 1:
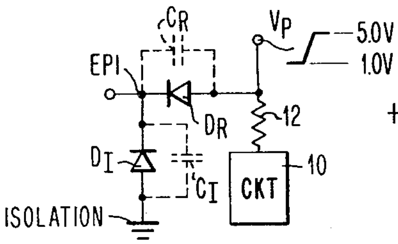
FIG. 1 is an equivalent circuit diagram wherein a supporting circuit is unpowered during the standby time.

FIG. 1 shows an equivalent circuit, such as a decoder, used as a supporting circuit on a monolithic memory structure. The circuit is unpowered during the standby time and is powered by a voltage higher than the standby supply for the memory cells during the select time. The equivalent circuit shows the circuit block 10, which is a supporting circuit to the memory array, with its associated resistor 12. The resistor is formed in a portion of the semiconductor structure. The remaining elements of the circuit are associated parasitic diodes and capacitances which occur because of the monolithic structure in which the resistor 12 is situated. $D_R$ is the resistor to epitaxial junction. The resistor is typically located in the epitaxial (*epi*) layer which is conventionally formed on a semiconductor substrate. Across the junction $D_R$ is the parasitic capacitance $C_R$. $D_I$ is the epitaxial to isolation junction and $C_I$ is the parasitic capacitance associated with that junction. The epitaxial region containing the resistor 12 is isolated by standard P-N junction isolation such as described in the W.E. Mutter U.S. Pat. 3,319,311 issued May 16, 1967 and assigned to the assignee of the present patent application.

When the resistor 12 signal is at one volt, the epitaxial layer potential wherein the resistors are located floats toward zero volts. The resistor bed or region to isolation junction has capacitance $C_I$ which increases rapidly as the voltage across the diode junction $D_I$ approaches zero. When the higher level power is applied, the resistor signal is applied to the supporting circuit. The signal to resistor 12 must be raised to 5 volts. However, to reach the 5 volt level, the capacitance $C_I$ must be charged through the junction $D_R$. This charging process significantly increases the turn on time for the supporting circuit.

Figure 2:
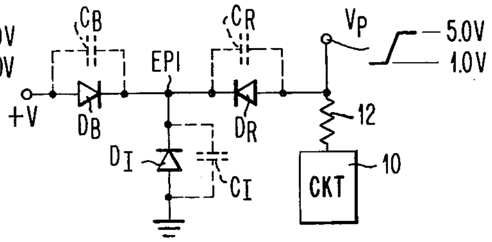
FIG. 2 is an equivalent circuit which illustrates the present invention.

FIG. 2 shows the circuit of the present invention wherein the region in which the resistors are located is provided with a standby bias from a power supply +V through a diode $D_B$. $D_B$ has associated with it parasitic capacitance $C_B$. The +V power supply would, of course, be greater than the one volt required by the resistors signal. The +V supply could be, for example, 3.3 volts. The arrangement with +V = 3.3 volts, maintains approximately 2.6 volts bias on $D_I$ during the standby time. When the resistor signal $VV_P$ is pulsed to its higher level value, it does not have to charge the $C_I$ until it begins to rise above 3.3 volts. The bilevel powered circuit 10 driven by $V_P$ will then respond much more quickly than the FIG. 1 circuit.

The operation of the FIG. 2 circuit is as follows. The +V voltage point and the ground point in FIG. 2 can act as signal grounds. The capacitances are as follows: $C_B$ is less than $C_R$ which is less than $C_I$. Assuming +V to equal 3.3 volts, the following by way of example applies. When the resistor signal is less than about 2.8 volts, $D_B$ is forward biased increasing the value of $C_B$ with $D_R$ and $D_I$ reversed biased. The primary signal ground is through $C_R$ in series with $C_B$ and is limited by the relatively low value of $C_R$. When the signal voltage increases, $D_R$ becomes forward biased with $D_B$ and $D_I$ reversed biased. The signal ground path then becomes $C_R$ in series with the paralleled pair $C_B$ and $C_I$. The limit of the shorting path is the $C_B$ in parallel with $C_I$.

The diode $D_B$ may be formed by providing a region of P-type diffusion in the N-type epitaxial region and making contact to the P region thus formed with the +V bias supply. Alternatively, the diode $D_B$ could be a Schottky barrier diode.

Figure 3:
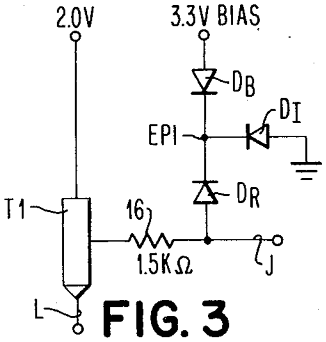
FIGS. 3 and 4 show actual circuits using the present invention.
Figure 4:
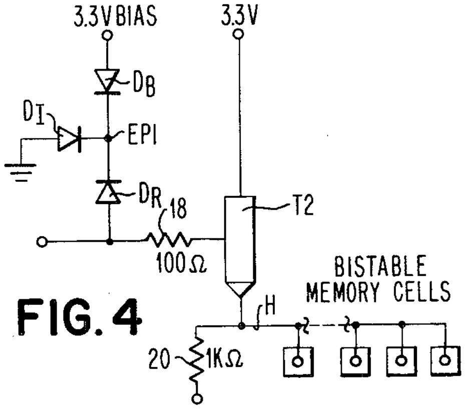

FIGS. 3 and 4 are actual examples of circuits using the present invention. The circuit of FIG. 3 utilizes a transistor T1 having a two-volt voltage supply to the transistor's collector. A resistor 16 of 1.5 kilohms is formed in a common resistor bed or region with the resistor 18 having a value of 100 ohms in the FIG. 4 circuit. The circuit of FIG. 4 utilizes a transistor T2 having a voltage supply to the collector of 3.3 volts together with the resistor 18 connected to the transistor's base. The diode $D_B$ is a single diode shared by both circuits FIGS. 3 and 4. A bias of plus 3.3 volts is applied through the diode to the N-type epitaxial (epi) bed or region where the resistors 16 and 18 are located as P-type diffusions. The transistors T1 and T2 are NPN bipolar transistors. The emitter of the FIG. 3 circuit is connected to a series of 16 bistable memory cells and through resistor 20 to the word driver supporting circuit. The particular function of the circuits do not form a part of this invention and will therefore not be described in detail. However, their function can be more fully understood by reference to the patent application filed on the same date as the present patent application having Ser. No. 074,432 entitled "Monolithic Memory System with Bi-Level Powering for Reduced Power Consumption" by John K. Ayling and Richard D. Moore, and assigned to the assignee of the present patent application.

Figure 5:
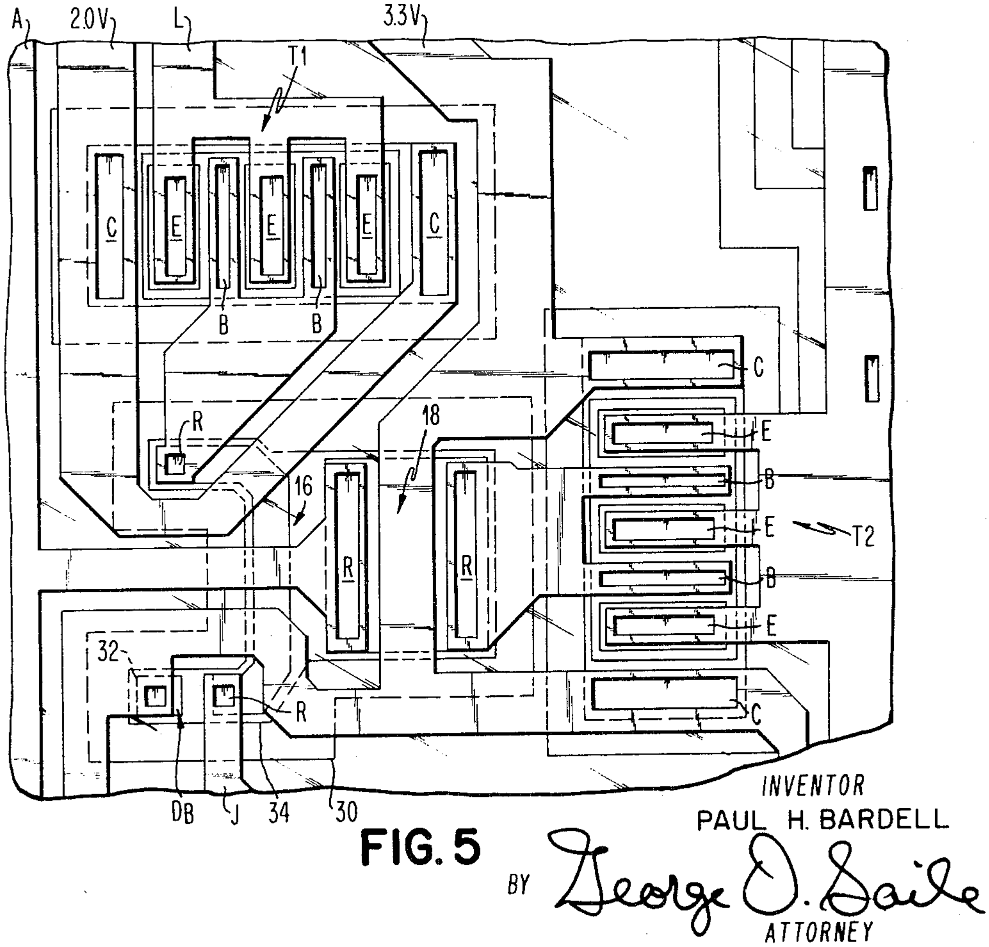
FIG. 5 shows a plane view of an actual device layout using the circuits of FIGS. 3 and 4.

FIG. 5 illustrates a plane view of the FIG. 3 and FIG. 4 portion of the integrated circuit. The conductor metallurgy, which is aluminum, is supported on top of a silicon dioxide insulating layer which insulates the metallurgy from the semiconductor devices underneath in all areas except where contacts are made to devices in the semiconductor monolith. The aluminum conductors are shown as raised layers above the surface of the integrated circuit. The circuit points A, L, H, and J and 2.0 and 3.3 volt power supplies correspond to the like points in FIGS. 3, 4, and 5. The transistors T1 and T2 have emitters, base, and collectors indicated by the letters E, B, and C, respectively, in FIG. 5. The resistor contacts for the resistors 16 and 18 are indicated by the letter R. The region of N-type epitaxial layer in which the resistors 16, 18 and the diode $D_B$ are situated is shown by a partially phantom line 30. The P-type diode diffusion which forms the diode $D_B$ is shown by the partially dashed line 32. A highly N-type doped buried area is located within the region 30 and is shown by partially dashed line 34. This area is within the substrate and the epitaxial layer. It is formed by doping the desired area in the substrate prior to the growth of an epitaxial N-type layer onto the substrate. The growth of the epitaxial layer being at very high temperature causes outdiffusion of the dopant from the substrate into the epitaxial layer. This region 34 is used to increase conductivity within the resistor bed region.

It should be understood that although in the example given herein only two resistors were used within that resistor bed or region, that a large number of resistors could be used in the region where the circuit requirements would suggest it. Also where a large number of resistors would be used in the region it may be desirable to use additional diodes $D_B$.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A monolithic integrated semiconductor memory structure having both an array of bistable cells and supporting circuits for said array in same semiconductor structure comprising:

means for providing power to said semiconductor structure at each of two different power levels wherein the lower power level is sufficient to maintain the said cells of the array in their selected states and the higher power level places at least one of said cells in an active condition;

a region in said semiconductor structure having at least one or more resistors;

said one or more resistors forming a portion of a circuit which is powered during the time said higher power is applied to said at least one of said cells; and bias source means for providing a bias to said region during said lower power level; and diode means for isolating said bias from said region when the voltage to the said at least one or more resistors reaches the said higher power level.

2. The memory structure of claim 1 wherein said diode means comprises a PN junction in said region.

3. The memory structure of claim 1 wherein said diode means comprises a Schottky barrier diode.

4. The memory structure of claim 1 wherein the region is a portion of an N-type epitaxial layer and the said at least one or more resistors is a P-type region.

5. The memory structure of claim 1 wherein said region having said at least one or more resistors is a portion of an epitaxial layer and is junction isolated from other regions of the memory structure.

6. The memory structure of claim 5 wherein said at least one or more resistors have parasitic capacitances across the resistor to epitaxial layer junction and the epitaxial layer to isolation junction.

7. The memory structure of claim 6 wherein said epitaxial layer is N-type.

8. The memory structure of claim 7 wherein there is a highly N-type doped buried area within said region.

9. The memory structure of claim 8 wherein said diode means comprises a PN junction in said region.

10. The memory structure of claim 8 wherein said diode means comprises a Schottky barrier diode.

* * * * *